(12) United States Patent
Lapierre et al.

(10) Patent No.: US 9,201,571 B2
(45) Date of Patent: Dec. 1, 2015

(54) LOGGING, EDITING AND PRODUCTION SYSTEM FOR ACTIVITIES OF LOCAL INTEREST AND RELATED VIDEO

(75) Inventors: Marc Lapierre, Brossard (CA); Harlan Neugeboren, Stamford, CT (US); Edward Massena, Elmsford, NY (US); Jonathan Krackehl, Wilton, CT (US)

(73) Assignee: It's Relevant, LLC, Stamford, CT (US)

( * ) Notice: Subject to any disclaimer, the term of this patent is extended or adjusted under 35 U.S.C. 154(b) by 134 days.

(21) Appl. No.: 13/592,817

(22) Filed: Aug. 23, 2012

(65) Prior Publication Data

US 2013/0191752 A1  Jul. 25, 2013

Related U.S. Application Data

(63) Continuation of application No. 13/345,406, filed on Jan. 6, 2012, now abandoned.

(60) Provisional application No. 61/430,503, filed on Jan. 6, 2011.

(51) Int. Cl.
| | |
|---|---|
| *G06F 3/00* | (2006.01) |
| *G06F 3/0484* | (2013.01) |
| *G11B 27/034* | (2006.01) |
| *G11B 27/10* | (2006.01) |
| *G11B 27/34* | (2006.01) |

(52) U.S. Cl.
CPC ............ *G06F 3/0484* (2013.01); *G11B 27/034* (2013.01); *G11B 27/105* (2013.01); *G11B 27/34* (2013.01)

(58) Field of Classification Search
CPC .......................................................... G06F 3/00
USPC .......................... 715/723, 743, 778, 780, 756
See application file for complete search history.

(56) References Cited

U.S. PATENT DOCUMENTS 5,339,393 A * 8/1994 Duffy et al. ................... 715/723
5,769,713 A    6/1998 Katayama
(Continued)

FOREIGN PATENT DOCUMENTS

EP    1221659 A1    7/2002

OTHER PUBLICATIONS

"OPUS Content Management," Anonymous, retrieved from http://dt.mentaldrivestudio.comjproductsjupload/files/OPUS2ContentManagement.pdf, Dec. 31, 2008.
(Continued)

*Primary Examiner* — Amy Ng
*Assistant Examiner* — Meseker Takele
(74) *Attorney, Agent, or Firm* — Patent GC LLC (57) ABSTRACT

Logging of data about events occurring during an activity is used in video production to reduce the cost of production of video for local audiences. A logging tool is configured to capture data according to a kind of activity, such as a basketball game, football game or other activity of local interest. The logging tool can be preconfigured with information about a specific activity, such as the date, time, venue, and participants, such as teams and players. Data entered for an event occurring during an activity is time stamped. This data is associated and synchronized with video for the event. The time stamped data can be used to generate clips of the video from the activity, based on synchronization between the logged data and the video, and the time stamps of the logged data.

20 Claims, 8 Drawing Sheets

(56) References Cited

U.S. PATENT DOCUMENTS

| | | |
|---|---|---|
| 6,122,559 A | 9/2000 | Bohn |
| 6,795,638 B1 | 9/2004 | Skelley, Jr. |
| 6,976,031 B1 | 12/2005 | Toupal et al. |
| 7,222,300 B2 | 5/2007 | Toyama et al. |
| 7,477,831 B2 | 1/2009 | Morishita |
| 7,769,819 B2 | 8/2010 | Lerman et al. |
| 8,006,189 B2 | 8/2011 | Dachs |
| 8,630,844 B1 | 1/2014 | Nichols et al. |
| 8,736,681 B2 | 5/2014 | Matsuzawa |
| 2001/0027475 A1 | 10/2001 | Givol et al. |
| 2002/0087979 A1 | 7/2002 | Dudkiewicz et al. |
| 2003/0093790 A1 | 5/2003 | Logan et al. |
| 2003/0177503 A1 | 9/2003 | Sull et al. |
| 2004/0017389 A1 | 1/2004 | Pan et al. |
| 2006/0047774 A1 | 3/2006 | Bowman et al. |
| 2006/0170760 A1 | 8/2006 | Anderson et al. |
| 2007/0189708 A1* | 8/2007 | Lerman et al. ............... 386/52 |
| 2007/0285815 A1 | 12/2007 | Herre et al. |
| 2007/0300157 A1 | 12/2007 | Clausi et al. |
| 2009/0044117 A1 | 2/2009 | Vaughan et al. |
| 2009/0103889 A1 | 4/2009 | Stone |
| 2009/0317051 A1 | 12/2009 | Millington |
| 2010/0043040 A1 | 2/2010 | Olsen, Jr. |
| 2010/0115410 A1 | 5/2010 | Fu et al. |
| 2011/0030031 A1* | 2/2011 | Lussier et al. ............... 726/1 |

OTHER PUBLICATIONS

"Creating Video Assets and Content with the MediaLog System," White Paper, The Next Generation of Professionals, Video Management Tools, Xpress Digital, pp. 1-7.

"Matchplay Digital Technologies for Winners," Annymous, retrieved from http://www.matchplay.com.au/filesjMatchPlayBrochure.pdf, Dec. 31, 2004.

"Matchplay: User Manual," Annymous, retrieved from http://www.matchplay.com.au/files/MatchPlayManualV3.pdf, Dec. 31, 2011.

"New Dual-Screen OPUS Sports & News Logging System from OmniBus," Anonymous, retrieved from http://www.broadcastpapers.comjNewsitem.cfm?objid=286, Sep. 8, 2006.

"Quick Start Guide for JC Video Systems Bullet System," pp. 1-68.

"Using Adobe Onlocation CS5," User Manual, pp. 1-55, last updated on Apr. 20, 2010.

Depommier, R. et al., "CARAT-ARC: A Scalable and Reliable Digital Media Archiving System," International Conference on Image Processing, vol. 1, pp. 17-20, Oct. 1997.

Final Office Action mailed Feb. 25, 2015 in U.S. Appl. No. 13/615,579, filed Sep. 13, 2012.

International Search Report and Written Opinion mailed Apr. 29, 2013 in International Patent Application No. PCT/US2013/020471.

Non-Final Office Action mailed May 8, 2014 in U.S. Appl. No. 13/615,579, filed Sep. 13, 2012.

\* cited by examiner

LOGGING, EDITING AND PRODUCTION SYSTEM FOR ACTIVITIES OF LOCAL INTEREST AND RELATED VIDEO

CROSS REFERENCE TO RELATED APPLICATIONS

This application is a continuing application of, and claims priority to and the benefits under 35 U.S.C. §120 of, U.S. patent application Ser. No. 13/345,406, filed Jan. 6, 2012, entitled "LOGGING, EDITING AND PRODUCTION SYSTEM FOR ACTIVITIES OF LOCAL INTEREST AND RELATED VIDEO," now pending, hereby incorporated by reference, which is a nonprovisional application of U.S. Provisional Patent Application 61/430,503, filed Jan. 6, 2011, entitled "LOGGING, EDITING AND PRODUCTION SYSTEM FOR SPORTS EVENTS AND RELATED VIDEO."

This application is a nonprovisional application of, and claims priority to and the benefits under 35 U.S.C. §119 of, U.S. Provisional Patent Application 61/430,503, filed Jan. 6, 2011, entitled "LOGGING, EDITING AND PRODUCTION SYSTEM FOR SPORTS EVENTS AND RELATED VIDEO," now expired, which is hereby incorporated by reference.

BACKGROUND

Traditional video production techniques are expensive to use when preparing video for a small, local audience. For example, local school sports and other activities have a sufficiently small audience that the cost of traditional video production, to regularly prepare good quality video productions, is prohibitive.

SUMMARY

To prepare video productions more cost effectively for a local audience, a computerized tool and workflow is provided. This tool and workflow allow metadata about an activity, such as local sports games, to be efficiently and consistently entered and associated with video. This metadata also is designed to assist in the editing of video about an activity. As a result, the logging of data about an activity is used as a video production tool and reduces the cost of video production.

A logging tool is configured to capture data according to a kind of activity, such as a basketball game, football game or other activity of local interest. The logging tool can be preconfigured with information about a specific activity, such as the date, time, venue, and participants, such as teams and players. Data about events occurring during the activity is entered during an activity and is time stamped. This data is associated and synchronized with video for the activity. The time stamped data can be used to generate clips of the video from the activity, based on synchronization between the logged data and the video, and the time stamps of the logged data. The data also can be used to generate graphics that can be overlaid on the video clips with which it is associated.

Video production with this tool involves having a journalist use the tool during the activity to log data (e.g., in basketball, shots taken, player names, etc.). After the activity, the logged data can be synchronized with the video by using the time for each event to identify the corresponding video for the events. The logged data can be used to create clips from the video (e.g., key plays in a basketball game can be identified in the logged data, and the time information for those plays are used to retrieve clips of video for those plays). The resulting clips, and their associated metadata, can be uploaded to a video server for distribution. When the clips are played back on the video platform, the metadata from the clips can be used to create on-screen graphics.

DETAILED DESCRIPTION

Logging of data from a sports activity or other activity of local interest is simplified by providing a logging tool with a simple interface that allows events during the activity to be tracked with time stamps. This information about events occurring during the activity can be associated and synchronized with video for the events to allow video programs to be quickly edited. The logging tool can be preconfigured with information about the activity, including the date, time, venue, and participants, such as teams and players.

Figure 1:
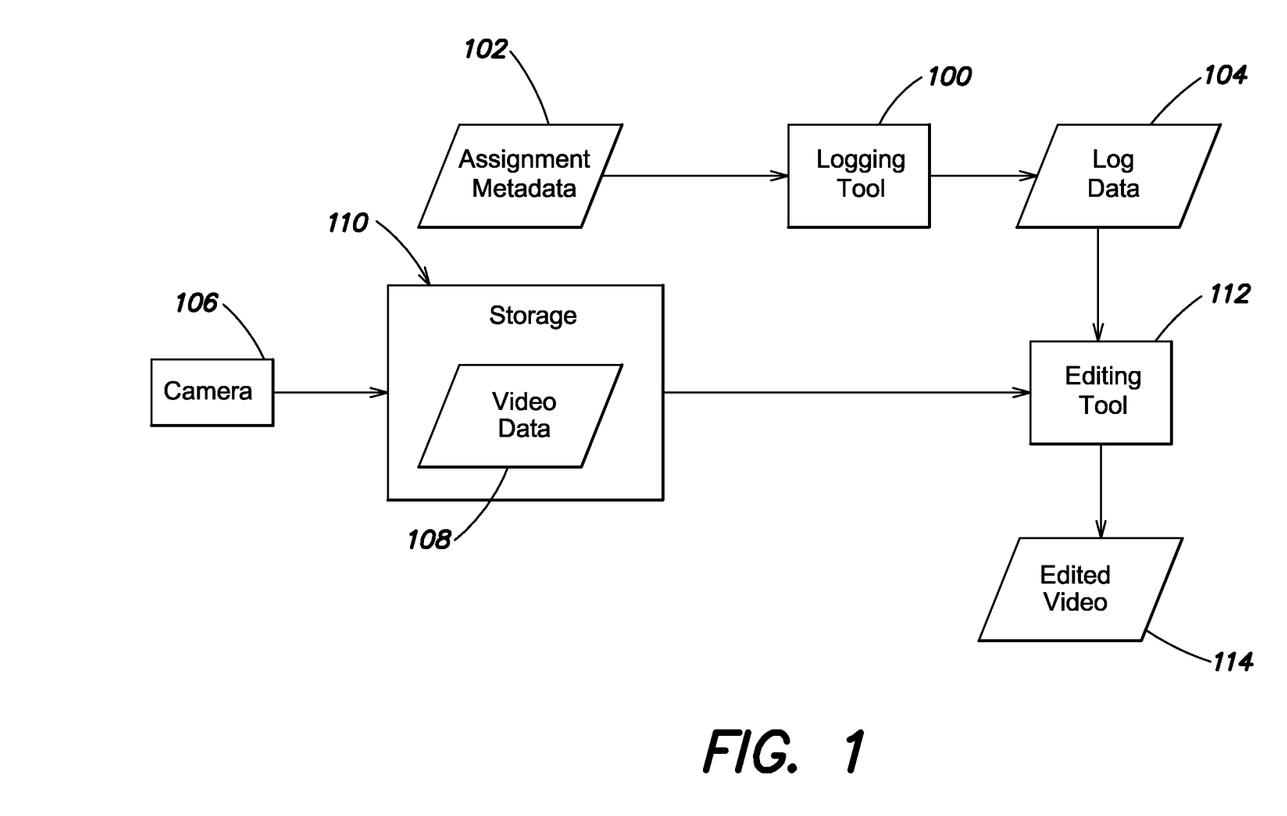
FIG. 1 is a data flow diagram illustrating a system for production, logging and editing video of an activity of local interest.

Referring to FIG. 1, a logging tool 100 receives assignment metadata 102 that describes the activity for which video will be captured and events will be logged. Such metadata can include, but is not limited to, the type of activity, participants, date, time, venue, etc. An example of an assignment file containing assignment metadata is shown in Appendix A.

The logging tool generally allows a user to enter data about different kinds of events that occur during the activity, as those events occur. In particular, as shown in the example implementations below, an activity of a certain type typically has several types of events that can occur during the activity. For example, in a basketball game, there can be a foul shot, a 2-point shot, a 3-point shot, etc. In baseball, there can be a strike, a ball, a walk, an "at-bat", a double play, a home run, etc. An event also can have one or more participants associated with it, such as the player. A user interface for the logging tool can present each of these kinds of events for selection, such as through a button on a touch screen. The logging tool also has a clock that is running during the event. When the user selects a kind of event, a time stamp for that selection is generated from the clock. The logging tool then can present a user interface to the user through which various information about the event can be input. The logged events are output as log data 104, which includes a list of event records, with each event indicating at least a type of event and a time, such as a time stamp or a time range (e.g., start and stop times), for the event. Examples of log files are shown in Appendix B and Appendix C.

One or more video cameras 106 also are used during the activity to create a video recording of the activity. Each video camera also has a clock or other mechanism from which time stamps for the video recording can be derived. The clock from the user interface of the logging tool also can be recorded in the video recording of the activity to assist in later synchronization. The video recording is stored as data files 108 in computer-readable storage 110.

An editing tool 112 receives log data 104 and information about the video recording from the data files 108, and allows an editor to produce an edited video 114 of the activity. In particular, the editing tool receives input from a user to select events from the log data, and in turn select clips of the video recording from the data files 108 based on the time stamps for the selected events. The editing tool then outputs an ordered list of these clips as the edited video 114. For example, each time stamp of an event is used to define a range of video (e.g., an amount of time before the event plus an amount of time after the event). As a particular example, each button in the logging tool that can be pressed creates a specific time code-referenced clip based on the running clock, with an in point at −10 seconds, and an output at +5 seconds from the current time stamp. For example if the user presses an event button at 15:42:35, the log file will include an event defining a clip with an in-time of 15:42:25 and out-time of 15:42:40, and thus 15 seconds run time. The values for the in point offset and out point offset can be adjustable per activity and per event type. The time stamps for events in the log data can be synchronized with the time stamps of the video in the editing tool by identifying and storing an offset between the logging tool clock and the video camera clocks.

Figure 2:
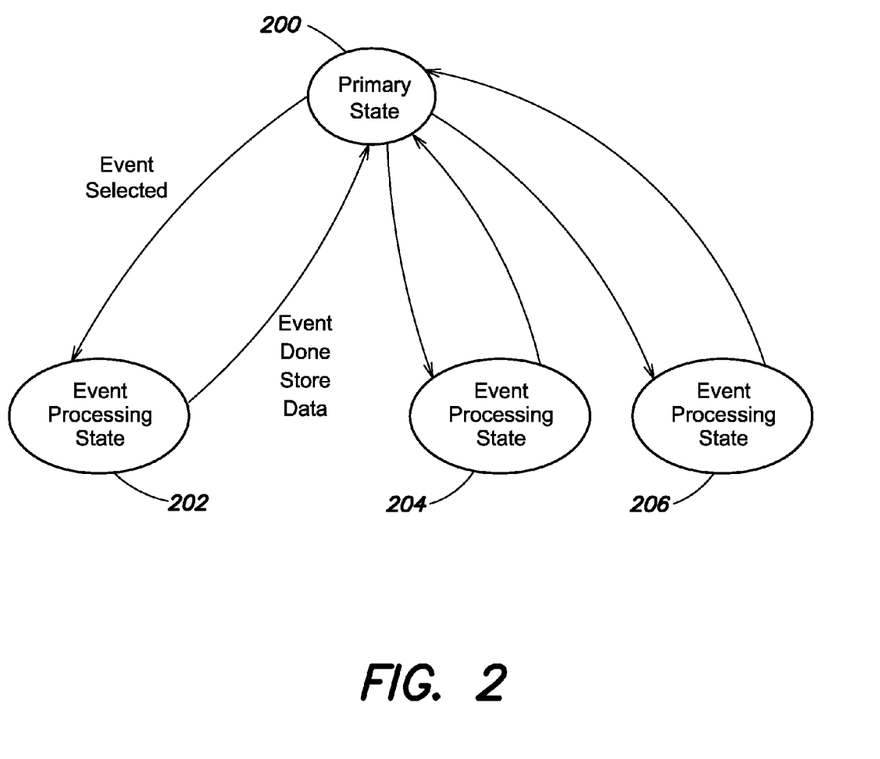
FIG. 2 is a state diagram for an example implementation of a logging tool.

Referring now to FIG. 2, a state diagram for an example implementation of a logging tool will now be described. In general, the logging tool as a primary state 200 in which a user interface for inputting events is displayed. Upon selection of an event, a transition to an event processing state, e.g., 202, occurs. The number of event processing states, e.g., 204, 206, etc., is dependent on the number of kinds of events that the logging tool is designed to track. In the event processing state, a user interface is displayed that allows a user to enter data for the event. When a user completes the input, the logging tool stores the event data, and transitions back to its primary state 200.

Figure 3:
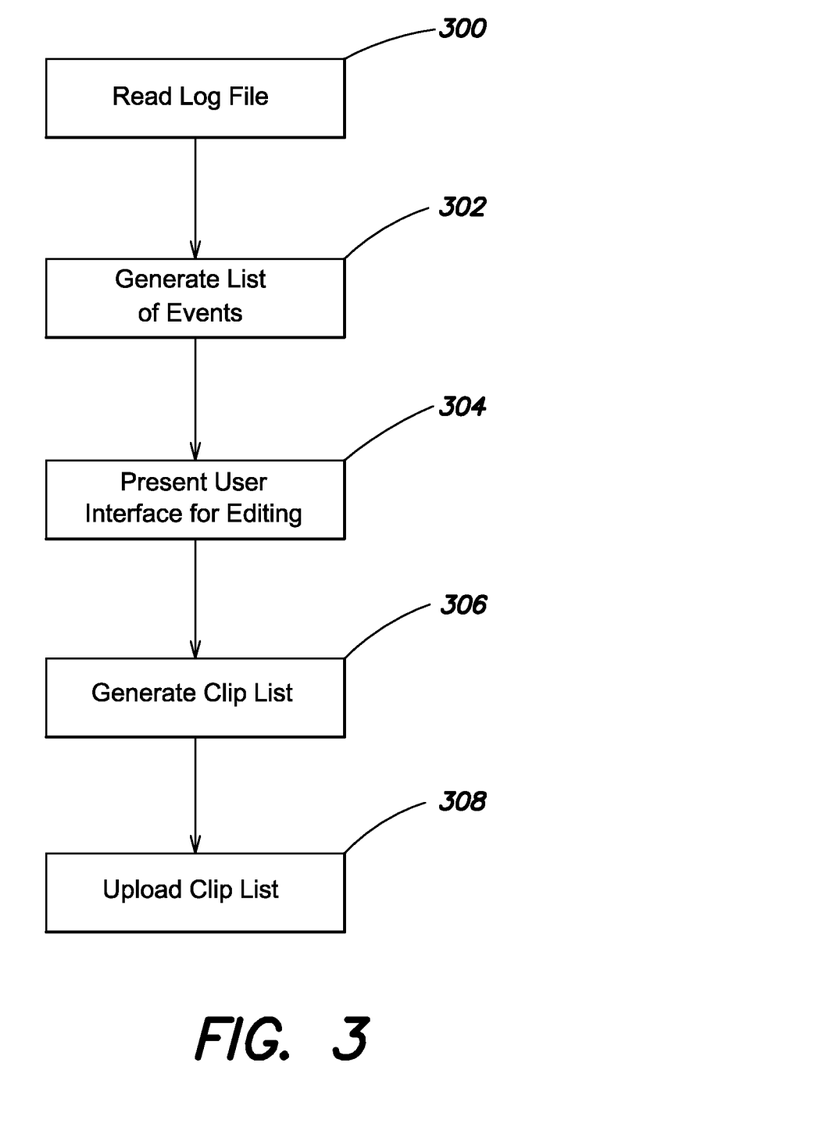
FIG. 3 is a flowchart of an example implementation of the editing tool.

Referring now to FIG. 3, a flowchart of an example implementation of the editing tool will now be described in more detail. The editing tool reads 300 a log file and processes the log file to identify each event. A list of events is generated 302 and displayed to the user. A user interface is presented 304 through which an editor can select one or more events for placement in the edited program, preview clips of events, trim clips of events, and perform other editing functions. Through such editing functions, a clip list is generated 306. The editing tool then allows the clip list to be uploaded 308 to a system from which the edited video program can be generated, played back or otherwise distributed.

Figure 4A:
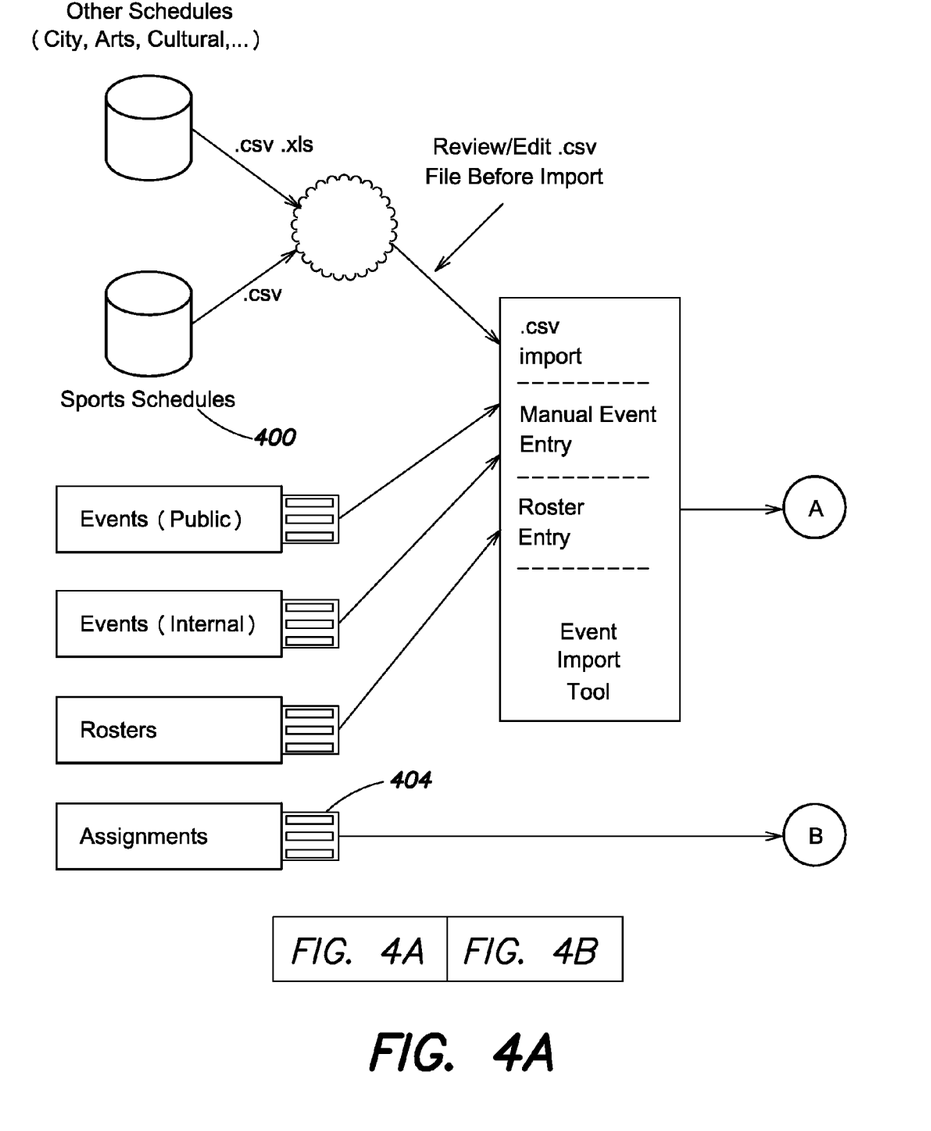
FIGS. 4A and 4B are a block diagram of an example system for logging and editing sports activities and related video.
Figure 4B:
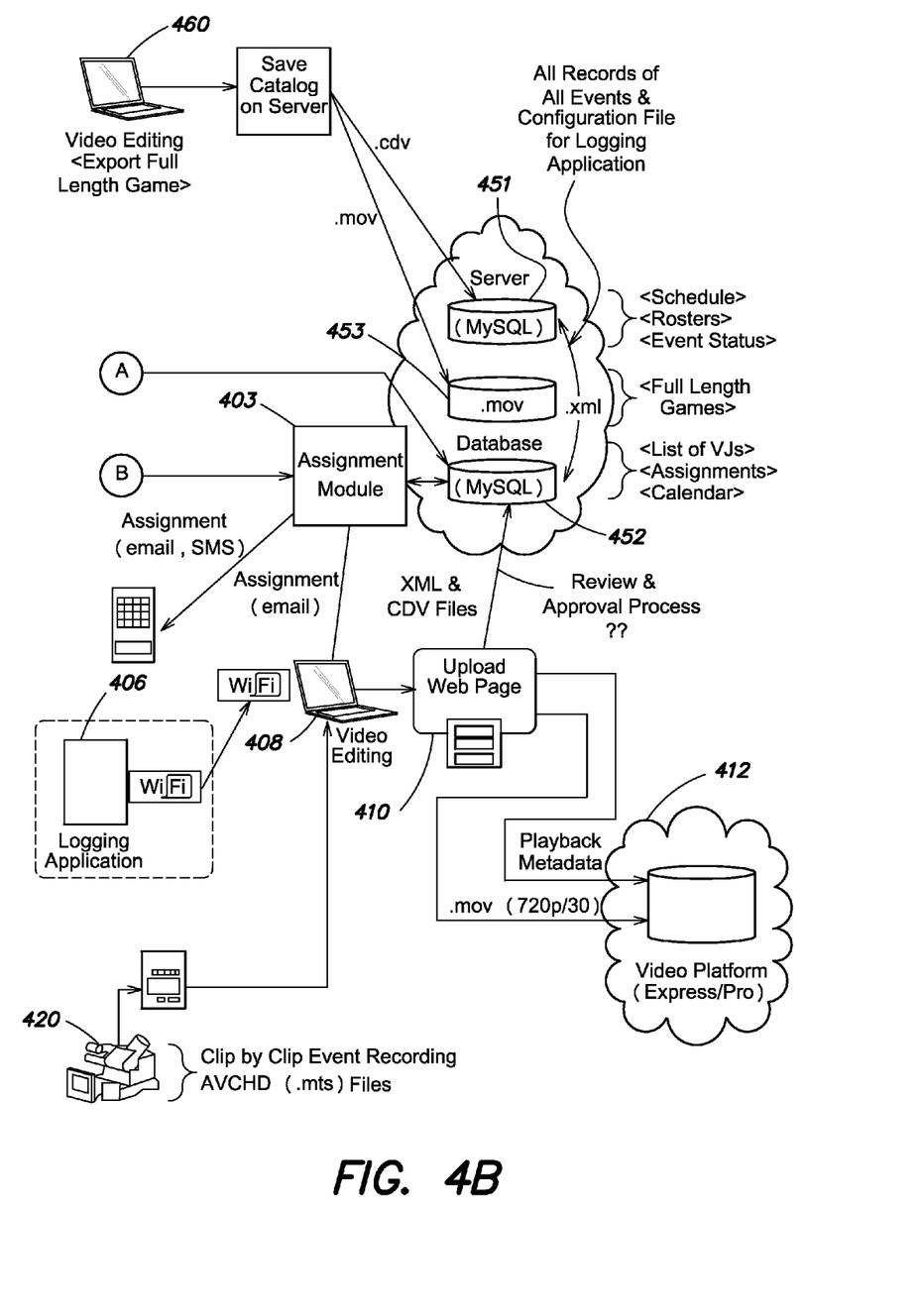

An example implementation of such a system will now be described in connection with FIGS. 4A and 4B. Early in the sport season, or ideally prior to the start of the sport season, sports schedules and team rosters are typically available (see 400 in FIG. 4A). An assignment file 404 is created by an assignment module 403 using the schedule, team roster and production team member (coordinator, journalist) information. The production team includes those individuals who will be responsible for logging the events at a game or activity. The assignment is made available and/or transferred to a logging application 406. Referring to FIGS. 4A and 4B, this information (400, 404) can be stored in a database such as shown at 402. The database 402 may include a database 452 for production (such as production team members and their assignments and calendars), an event database 454 (storing information such as schedules, rosters and event status) and a video database 453.

At a game, the journalist opens the assignment file using the logging application 406 and gets ready to log the events during the game. For example, the journalist may set the color in the user interface for each team, identify the players present at the game, select the players that are on the field, add new players, etc.

During a game, the journalist logs events in real time as they happen by pressing buttons in a user interface of a logging application 406. An example user interface is described below in connection with FIG. 5. This application ideally has a touchscreen interface, such as mobile device or tablet computer. The journalist can review the logged events, make changes, undo entries, etc. Events created by the logging application during this process use a combination of values provided in the assignment file, generic metadata fields/keys and sports-specific metadata fields/keys provided by a configuration file or an equivalent set of metadata fields/keys pre-programmed in the logging application. An example naming convention for basketball for each logged event is described below. Other sports would follow a similar pattern. During the game, one or more video cameras 420 also record video of the game.

After the game is finished, or after each period/quarter/half, the journalist saves the log file locally to the machine that is running the logging application. The file(s) then are used by an editing application 408. The journalist opens the logging application file(s) in the editing application, assigns media to the sub clips, trims the sub clips, filters the sub clips to select the ones that are relevant and exports the result of his/her work as an XML file and associated movies.

The editing application pairs up video files with logs made using the logging application. This pairing can be accomplished by having a same unique identifier associated with the assignment file and the video files used for an event. An editor, using the editing application, can review selections made in the logs by watching the video, changing in points and out points, editing details in the metadata of each clip, and deleting clips when necessary. An example user interface for the editing tool is described below in connection with FIG. 6. The editing application then outputs a series of video and XML files that have metadata from the logs embedded in them so that they may be imported easily into a website or other distribution channel.

An example workflow for an editor using the logging and editing applications is the following. First, the user logs a game using the logging application. Time code is generated from time of day on the device. The user exports this log as an XML file. The user imports the XML file and all video clips associated with the log into the editing application. The editing application prompts user to align the XML with the clips with a standard time offset. A button such as a "Tip off marker" would be a simple way to provide a synchronization of the video with the logged event data. The user could be prompted to "Touch Here" when a designated event from the XML file occurs, such as a tip off in a basketball game. The user uses the editing application to review clips. They are able to sort (organize) and filter (display only certain ones) the clips by time, player name, player number, play type, highlight flag, length of clip, or club (team name). The user then can set new in points and out points for each logged play with an easy to use playback interface. The user can select clips to include in the "highlights"—toggle button (green and red)—we will use the highlight selects to make up the clip set on the site. The user then exports all of the clips and XML with metadata embedded in the files so that the website or distribution channel can easily process them, and extrapolate the titles, score etc., for the on screen graphics on the platform.

The journalist then opens the upload tool 440, selects the XML file and proceeds with the upload of the movie clips and their associated metadata fields and values to the database 402. Upon successfully uploading the movie clips, the journalist's tasks for the creation of a video program, such as a highlight reel, are completed. The video also could be uploaded to another video distribution platform 442. With information in the database 402, other editing applications 460 also could access this information and edit video programs.

Figure 5:
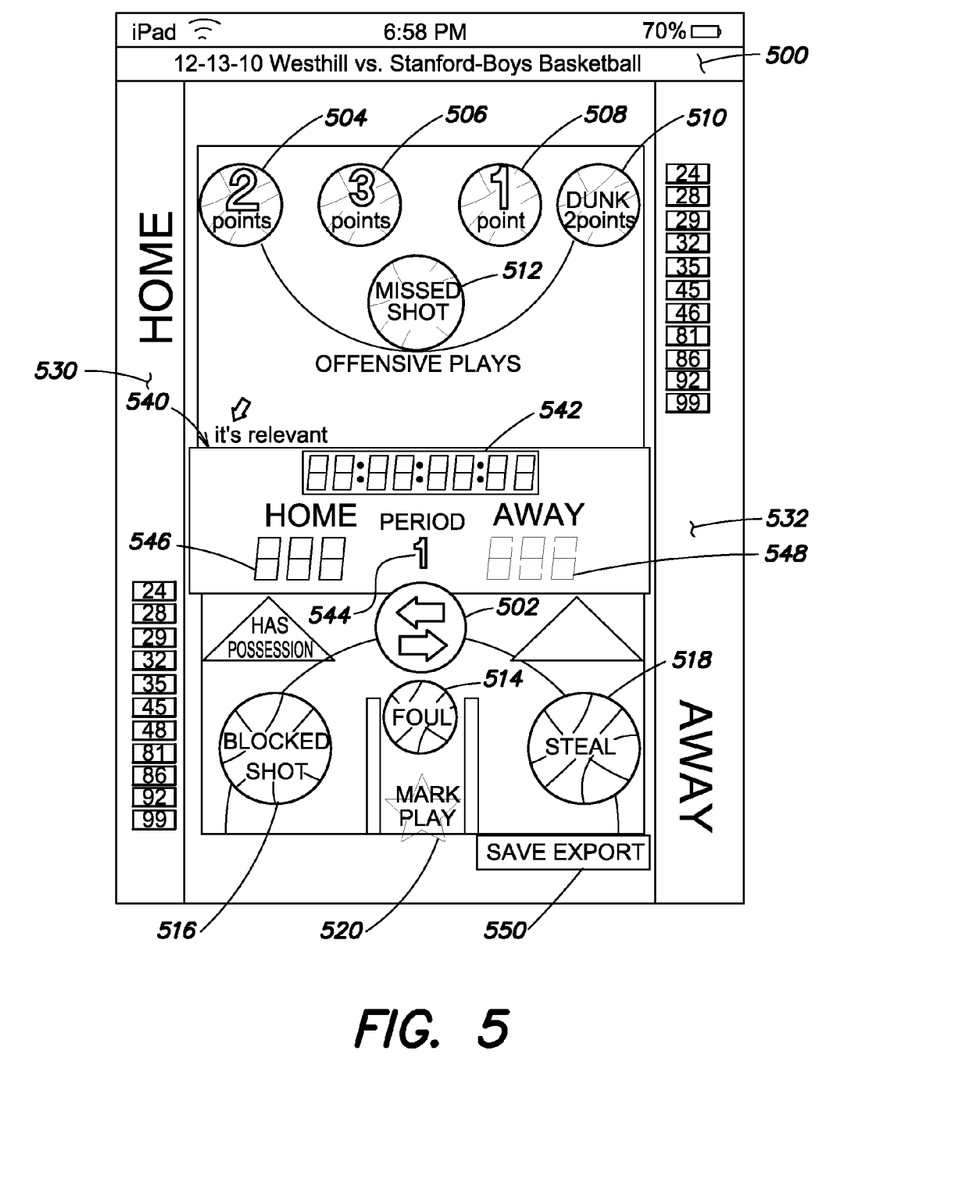
FIG. 5 is an illustration of an example user interface for a logging tool.

Referring now to FIG. 5, an example user interface for a logging tool will now be described. This user interface has been designed for logging a basketball game.

Prior to displaying this interface, the logging tool can display a color selector to allow the journalist to select a color for each of the teams. The selected colors are used in the logging interface as background color for buttons assigned to the teams.

The user interface of FIG. 5 is a main page from which logging is performed. For most actions, the user presses only one button without requiring confirmation. Escaping from an event button generally is accessible by pressing anywhere outside a dialog screen according to usual user interface convention.

Within the user interface, a title bar 500 displays the name of the selected assignment file. The title bar also can display navigation buttons in order to provide the user with access to the ability to select a different assignment file, change color selections, or view, save or export the log file and participant information.

A center button 502 makes the possession status toggle between the HOME team (on the left) and the AWAY team (on the right). Each time this button is pressed, a "BK_Possession" variable is set to the selected team (BK_Possession=HomeTeam or AwayTeam).

The main logging buttons will now be described in connection with Table I, which describes the actions tied to each button available. The table indicates the metadata keys values (BK_PlayResult, BK_PlayType and HighlightFlag) associated with the press of each button. The Notes indicate other actions that are performed by the logging tool, such as updating the score, or prompting the journalist for information about the player. Each time one of the buttons is pressed, the user is prompted to identify the player(s) that was (were) involved in the logged event. A user interface with buttons corresponding to each of the players can be displayed for this purpose. With such an interface, the user can either select a player from the HOME or AWAY team, or, in the event he does not know which player was involved, he can select the HOME or AWAY team button.

TABLE I

| Button | BK_PlayResult | BK_PlayType | HighlightFlag | NOTES |
|---|---|---|---|---|
| 2-point 504 | 2-Point Shot | | ** | If (Possession = "HOME") HomeTeamScore = HomeTeamScore + 2) If (Possession = "AWAY") AwayTeamScore = AwayTeamScore + 2) |
| 3-point 506 | 3-Point Shot | | **** | If (Possession = "HOME") HomeTeamScore = HomeTeamScore + 3) If(Possession = "AWAY") AwayTeamScore = AwayTeamScore + 3) |
| Free throw 508 | Free Throw Shot | | ** | If (Possession = "HOME") HomeTeamScore = HomeTeamScore + 1) If(Possession = "AWAY") AwayTeamScore = AwayTeamScore + 1) |
| 2-point dunk 510 | 2-Point Dunk | | **** | If (Possession = "HOME") HomeTeamScore = HomeTeamScore + 2) If(Possession = "AWAY") AwayTeamScore = AwayTeamScore + 2) |
| Missed shot 512 | Missed Shot | | | |
| Foul 514 | Foul | | | |
| Blocked shot 516. | Blocked Shot | | *** | |
| Steal 518 | Steal | | *** | |
| Mark Play 520 | | | ***** | |

Using this example interface, an example of how the state of the system changes and how log events are created will now be described in detail. To start, the current state of the system at the time of a button press is defined. For the example below, the Home team has possession of the ball (BK_Possession=Home), the score is HomeTeam 34 (BK_HomeTeamScore=34), AwayTeam 28 (BK_AwayTeamScore=28), and it is the first quarter of the game (BK_Quarter=1). The assignment file populated a series of fields for which the data never changes during the coverage of an event (such as BK_HomeTeamID, BK_AwayTeamID, EventID, AssignmentID, AssignmentTitle, AssignmentDescription, EventTypeID, CoordinatorInfo, Reporter1Info, Reporter2Info, Club1ID, Club2ID, and the complete list of all the players on both teams, their respective jersey numbers, their position and their identifiers).

In one implementation log events, related to Appendix B, can be created as follows. At T=14:19:40:00, the user presses the <2-points> button. He is then prompted to select the player that scored. He selects #5 from the home team roster (This player's name is Tim Smith, member #245 (MID)). The resulting XML data generated for this logged entry is:

```
<CLIP INDEX='5_Tim Smith_2-Point Shot1'>
<NAME>5_Toby Panawki_2-Point Shot1</NAME>
<IN>14:19:30:00</IN>
<USER62 name='BK_PlayersInvolved'>#5 Toby Panawki</USER62>
<USER61 name='BK_IDPlayersInvolved'>245</USER61>
<USER43 name='BK_HomeTeamID'>West High</USER43>
<USER44 name='BK_AwayTeamID'>Sample High</USER44>
<USER1 name='EventID'>55</USER1>
<USER63 name='BK_Quarter'>1</USER63>
<USER66 name='BK_PlayResult'>2-Point Shot</USER66>
<USER8 name='AssignmentID'>123</USER8>
<USER12 name='AssignmentTitle'>Sample Title</USER12>
<USER13 name='AssignmentDescription'>This is a sample assignment</USER13>
<USER6 name='EventTypeID'>4</USER6>
<USER9 name='CoordinatorInfo'>Jane Doe</USER9>
<USER10 name='Reporter1Info'>Samatha Doe</USER10>
<USER11 name='Reporter2Info'>Jason Smith</USER11>
<USER15 name='Club1ID'>21</USER15>
<USER16 name='Club2ID'>20</USER16>
<USER64 name='BK_Possession'>Home</USER64>
<USER20 name='Highlight Info'></USER20>
<USER19 name='Highlight Flag'>**</USER19>
<USER67 name='BK_HomeTeamScore'>36</USER67>
<USER68 name='BK_AwayTeamScore'>28</USER68>
<OUT>14:19:45:00</OUT>
<TIMECODE>30</TIMECODE>
</CLIP>
```

In this example, various data comes from the following fields in the assignment file. The coordinatorInfo field comes from the <coordinator> field. The Reporter1Info field comes from the first <journalist> field. The Reporter2Info field comes from the second <journalist> field. The AssignmentTitle field comes from the <Assignment title> field. The AssignmentDescription comes from the <Assignment description> field. The EventTypeID comes from the <EventType ID> field. The Club1ID comes from the first <Club ID> entry. The Club2ID comes from the second <Club ID> entry.

At T=14:19:40:00, the user presses the <3-points> button. All other parameters except the time code used in the previous example remain the same. The resulting log entry is created, noting only the values of the various metadata keys that are different from the 2-Point example, except the time code. The remaining log entries below are similarly presented.

```
<USER66 name='BK_PlayResult'>3-Point Shot</USER66>
<USER19 name='Highlight Flag'>****</USER19>
<USER67 name='BK_HomeTeamScore'>37</USER67>
```

At T=14:19:40:00, the user presses the <1-point> button. The resulting log entry is created:

```
<USER66 name='BK_PlayResult'>Free Throw Shot</USER66>
<USER19 name='Highlight Flag'>**</USER19>
<USER67 name='BK_HomeTeamScore'>35</USER67>
```

At T=14:19:40:00, the user presses the <DUNK 2-points> button. The resulting log entry is created:

```
<USER66 name='BK_PlayResult'>2-Point Dunk</USER66>
<USER19 name='Highlight Flag'>****</USER19>
<USER67 name='BK_HomeTeamScore'>36</USER67>
```

At T=14:19:40:00, the user presses the <Missed Shot> button. The resulting log entry is created:

```
<USER66 name='BK_PlayResult'>Missed Shot</USER66>
<USER19 name='Highlight Flag'></USER19>
<USER67 name='BK_HomeTeamScore'>34</USER67>
```

At T=14:19:40:00, the user presses the <Foul> button. The resulting log entry is created:

```
<USER66 name='BK_PlayResult'>Foul<USER66>
<USER19 name='Highlight Flag'></USER19>
<USER67 name='BK_HomeTeamScore'>34</USER67>
```

At T=14:19:40:00, the user presses the <Blocked Shot> button. The resulting log entry is created:

```
<USER66 name='BK_PlayResult'>Blocked Shot</USER66>
<USER19 name='Highlight Flag'>***</USER19>
<USER67 name='BK_HomeTeamScore'>34</USER67>
```

At T=14:19:40:00, the user presses the <Steal> button. The resulting log entry is created:

```
<USER66 name='BK_PlayResult'>Steal<USER66>
<USER19 name='Highlight Flag'>***</USER19>
<USER67 name='BK_HomeTeamScore'>34</USER67>
```

At T=14:19:40:00, the user presses the <Mark Play> button. The resulting log entry is created:

```
<USER66 name='BK_PlayResult'></USER66>
<USER19 name='Highlight Flag'>*****</USER19>
<USER67 name='BK_HomeTeamScore'>34</USER67>
```

In another implementation, related to Appendix C, log events can be created as follows.

At T=14:19:40:00, the user presses the <2-points> button. He is then prompted to select the player that scored. He selects #5 from the home team roster (This player's name is Tim Smith, member #245 (MID)). The resulting XML data generated for this logged entry is:

```
<eventTag>
    <in>14:19:30:00</in>
    <out>14:19:45:00</out>
    <highlight>false</highlight>
    <metadata>
        <value key="BK_PlayersInvolved">Tim Smith</value>
        <value key="BK_IDPlayersInvolved">245</value>
        <value key="BK_HomeTeamID">20</value>
        <value key="BK_AwayTeamID">65</value>
        <value key="BK_Quarter">1</value>
        <value key="BK_PlayResult">2 Point Shot</value>
        <value key="BK_Possession">Home</value>
```

```
        <value key="BK_HomeTeamScore">36</value>
        <value key="BK_AwayTeamScore">28</value>
    </metadata>
</eventTag>
```

In this example, various data comes from the following fields in the assignment file. The HomeTeamID comes from the first <Club ID> entry. The AwayTeamID comes from the second <Club ID> entry. Additionally the IDPlayersInvolved and PlayersInvolved are automatically populated by cross referencing the player's jersey # <Identifier> and corresponding <mid> and <FirstName><LastName> information contained in the assignment file.

At T=14:20:10:00, the user presses the <3-points> button. He is then prompted to select the player that scored. He selects #10 from the home team roster (This player's name is Phil Shapiro, member #268 <MID>). The resulting XML data generated for this logged entry is:

```
<eventTag>
    <in>14:20:00:00</in>
    <out>14:20:15:00</out>
    <highlight>true</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">3 Point Shot</value>
        <value key="BK_Possession">Home</value>
        <value key="BK_HomeTeamScore">39</value>
        <value key="BK_AwayTeamScore">28</value>
    </metadata>
</eventTag>
```

At T=14:19:40:00, the user presses the <1-point> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>false</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">1 Point Shot</value>
        <value key="BK_Possession">Home</value>
        <value key="BK_HomeTeamScore">40</value>
        <value key="BK_AwayTeamScore">28</value>
    </metadata>
</eventTag>
```

At T=14:19:40:00, the user presses the <DUNK 2-points> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>true</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">Dunk</value>
        <value key="BK_Possession">Home</value>
        <value key="BK_HomeTeamScore">42f</value>
        <value key="BK_AwayTeamScore">28</value>
    </metadata>
</eventTag>
```

At T=14:19:40:00, the user presses the <Missed Shot> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>false</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">Missed Shot</value>
        <value key="BK_Possession">Home</value>
        <value key="BK_HomeTeamScore">42</value>
        <value key="BK_AwayTeamScore">28</value>
    </metadata>
</eventTag>
```

At T=14:19:40:00, the user presses the <Foul> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>false</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">Foul</value>
        <value key="BK_Possession">Home</value>
        <value key="BK_HomeTeamScore">42</value>
        <value key="BK_AwayTeamScore">28</value>
    </metadata>
</eventTag>
```

At T=14:19:40:00, the user presses the <Blocked Shot> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>false</highlight>
    <metadata>
```

-continued

```
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">Blocked Shot</value>
        <value key="BK_Possession">Home</value>
        <value key="BK_HomeTeamScore">42</value>
        <value key="BK_AwayTeamScore">28</value>
    </metadata>
</eventTag>
```

At T=14:19:40:00, the user presses the <Steal> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>false</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">Steal</value>
        <value key="BK_Possession">Home</value>
        <value key="BK_HomeTeamScore">42</value>
        <value key="BK_AwayTeamScore">28</value>
    </metadata>
</eventTag>
```

At T=14:19:40:00, the user presses the <Mark Play> button. He is then prompted to select the player that scored. He selects #10 from the home team roster (This player's name is Phil Shapiro, member #268 <MID>). The resulting XML data generated for this logged entry is:

```
<eventTag>
    <in>14:19:30:00</in>
    <out>14:19:45:00</out>
    <highlight>true</highlight>
    <metadata>
        <value key="BK_PlayersInvolved">Phil Shapiro</value>
        <value key="BK_IDPlayersInvolved">268</value>
        <value key="BK_HomeTeamID">20</value>
        <value key="BK_AwayTeamID">65</value>
        <value key="BK_Quarter">1</value>
        <value key="BK_PlayResult">Marked Play</value>
        <value key="BK_Possession">Home</value>
        <value key="BK_HomeTeamScore">42</value>
        <value key="BK_AwayTeamScore">28</value>
    </metadata>
</eventTag>
```

The left (HOME) side 530 and right (AWAY) side 532 of the interface are used to display the lists of players in each team that are present at the game. In this example, each player has a button with a jersey number, and the buttons are displayed in numerical order with the lowest values at the top. The background colors for these areas are the ones selected previously for the home and away teams through the color selector.

A separate interface can be provided to allow a user to select which players are present from the complete roster. The buttons can also be color coded to indicate whether the player is on the court or off the court. For example, each button can be either colored with a blue background when the player is identified as being ON-THE-FIELD, or with a red background when the player is identified as OFF-THE-FIELD. The user can toggle the ON-THE-FIELD/OFF-THE-FIELD status of each player by simply pressing the player's corresponding button. Because, in basketball, the number of players on the field is limited to 5 per team, the logging tool can limit 5 players to be selected as ON-THE-FIELD at any given time.

Another user interface can be provided to allow the list of players to be edited, including whether they are present at the game, the jersey number, role on the team, etc. This list can be used by the logging tool to prompt for input during the game. It also can be exported as part of the log file.

A scoreboard 540 is in the central area of the main logging screen. It is composed of a time display, the home and away teams scores and an indicator for the current period. The time display 542 shows the time of day. It can be retrieved from the clock value of the host computer. The quarter display 544 is a user setting. The user can modify the quarter value by pressing on the label 544, for example. Changing the quarter sets the BK_Quarter field which is stored in each log entry. The home and away scores are shown at 546 and 548 respectively. These scores display the BK_HomeTeamScore and BK_AwayTeamScore values that are updated as players score and the events for those scores are logged. In addition, if for some reason there is an error in the displayed score, the user can modify the score by pressing on the label for example, which can in turn prompt the user to enter a correct score.

The user interface also includes a save/export button 550. In response to a user pressing this button, the log entries for the activity, or for a segment of the activity if the activity is not yet completed, are processed. For example, if the log entries are stored in memory, they can be saved to a file. However, preferably, a file is being used to store the log entries, and this file is continually updated on the fly after each event to prevent loss of logged information. Pressing the SAVE/EXPORT can close the file. After closing the file the system can perform a variety of other actions. For example, an email window can be opened with the file as an attachment. Another file can be opened for the next segment of the activity.

It should also be pointed out that the data used to log events also can be used to name events and their related video clips. An example naming convention for events in the logged data for basketball, as found in Appendix B, is the following: 3-Point/2-Point/1-Point/Dunk 2-Point/Blocked Shot/Foul/Steal. These values can be used to make up the names of the events and hence the sub clips. For example, a log event may include the following data:

```
<AssignmentID>
<MID>
<BK_PlayResult>
Part_<BK_Period>
<UniqueCounter>
<HighlightFlag>
```

From these field names, the name of an event/sub clip can be in the form of: <AssignmentID>_<MID>_<BK_PlayResult/PlayType>_<HighlightFlag>_Part<BK_Period>_<UniqueCounter>. Thus, as a concrete example, the name of an event/sub clip can be: 123_359_3-PointShot_4-Star_Part2_1.

Having now described an example implementation of a logging tool, an example editing tool will now be described in connection with FIG. 6.

The editing tool takes the log files created by the logging tool, processes the data in the log file with video clips for the activity, clips the video accordingly, passes through metadata from the log file to the edited clips, and then upload the clips. In this example implementation, this tool unifies several steps of the sports production workflow described above.

The editing tool can have several different interfaces, or screens, through which an editor can access different operations in this work flow. For example, one screen can be provided for a user to select a project to work on, based on the log files that are present in a defined folder. Projects can be labeled as unfinished projects and finished projects, and can be listed with the most recent projects at the top. "Finished" projects are those that the editing tool has already processed through to an upload of a final edited video.

The editing tool also can have a screen, called a clip list screen, which allows the user to make selections from the clips that were created in the log file. An example is shown in FIG. 7. Clips that are marked as highlights can be displayed at the top 702 of a list view 700. Other clips are shown at the bottom 706 of the list view. A search and/or filter function can be accessed through an input field 704 to allow a user to search clips, filter those viewed, etc., by any of the valid fields in the log file. The clips marked as highlights from the original clip list define the edited video. Through conventional user interface techniques, the user can be enabled to manipulate this list by selecting clips, adding a selected clip to the highlights, and/or removing a selected clip from the highlights. Also, the user can select any clip from this view to open in a detailed View/Edit Clip screen shown in FIG. 6.

This clip list screen also allows the user to edit the assignment/event information through buttons 720 and 722. Another button 724 can be provided, called an Edit Abstract button, to allow the user to type an abstract that will be included in the output of the editing tool, and can be displayed at 726. Such data can be passed through on playback to a graphics overly generator, for example. A "Play All Highlights" button 728 can be provided, which when pressed by the user causes the tool to present video playback of all the selected clips, optionally with overlay graphics. Another button can be provided, that when selected causes the tool to compute and display the total run time (displayed at 730) of the selected clips. An export button can be provided to allow a user to send the completed edit program description.

Another button 732 can be provided that causes a synchronization screen to be displayed. When this screen is displayed, the editing tool plays back the first original source video file for the activity and prompts the user to mark the point at which the first logged event takes place. This screen can display the play result and player involved for the first logged event so that the user can visually confirm that they are marking the first logged event. When the user marks this location and confirms, the editing tool adjusts the time code entries for the rest of the log file according to the offset between the video time code and the first logged event.

The editing tool can have another screen that can be accessed by selecting a Save/Export/Upload button, which can be placed on the clip list screen or editing screen. This screen displays the upload progress and provides the user with data about connection speed, time elapsed and estimated time remaining Upon completion of the highlights upload this screen can be used to prompt the user to upload full quarter files to a different server location for coaches to download and view later.

Figure 6:
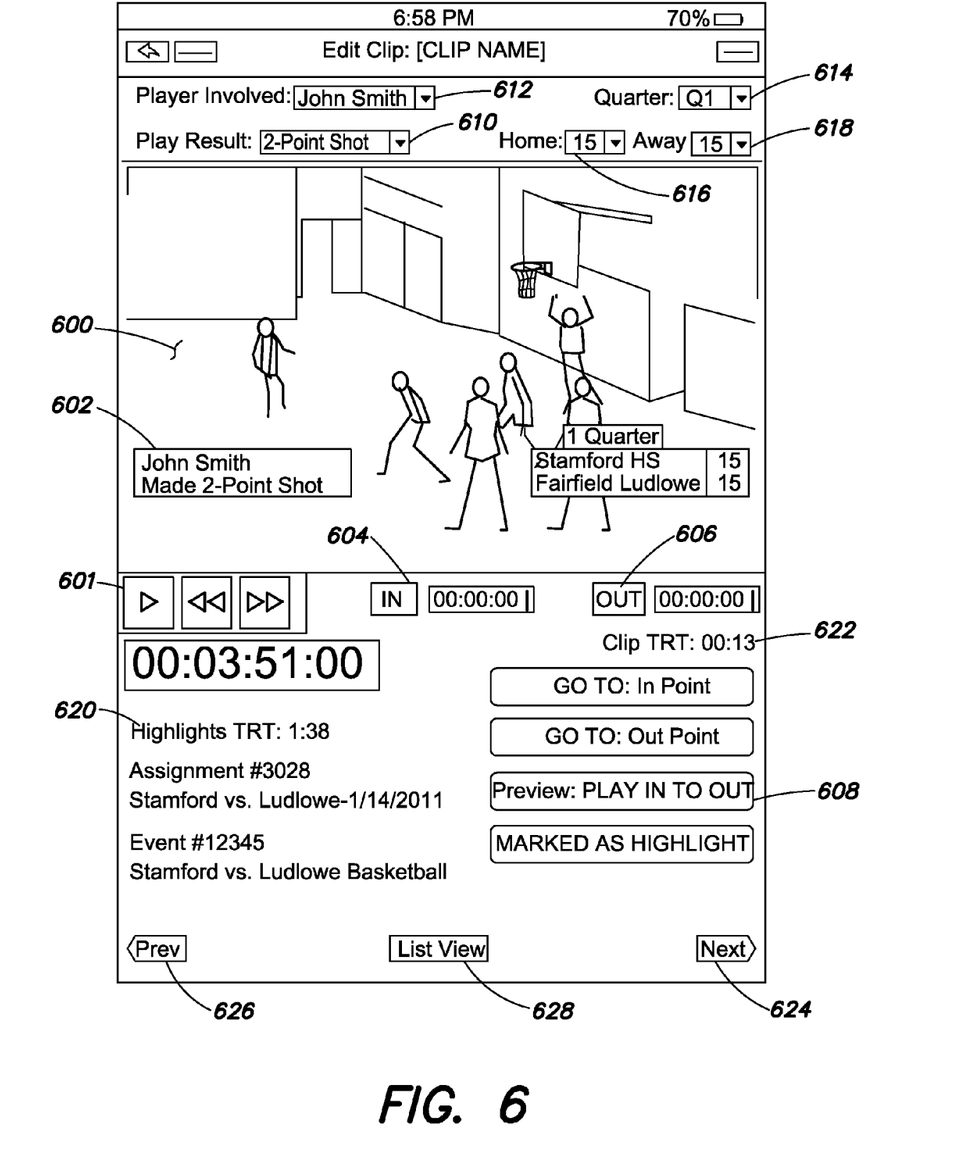
FIG. 6 is an illustration of an example user interface for an editing tool.
Figure 7:
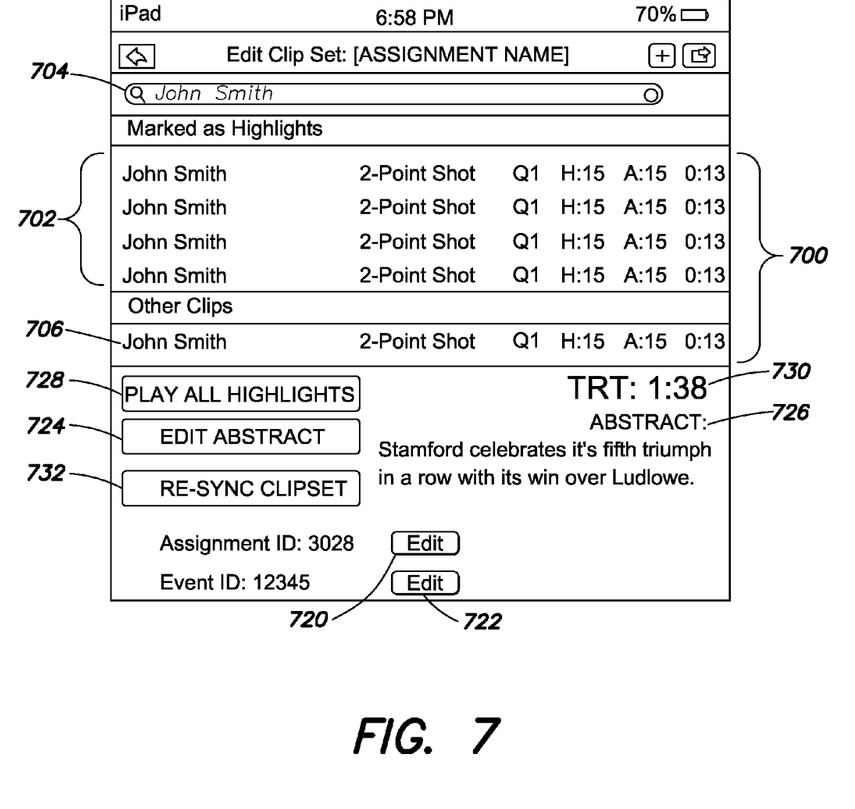
FIG. 7 is an illustration of an example user interface for an editing tool.

The screen shown in FIG. 6 allows a user to playback an edit a clip for a selected event. The clip is played back in a viewer 600, with play control 601, and can include a graphics overlay 602 generated from the log data. During playback the user can define new in-point and out-point for the clip through controls 604 and 606. With the Preview : PLAY IN TO OUT button 608 the user can playback only the selected clip length to preview the finished product. The user can modify the clip's meta data through constrained drop-down lists for play result 610, player involved 612, quarter 614, home score 616 and away score 618. The user can view the Total Run Time 620 for the highlights as presently defined, and can view the Run Time 622 for the individual clip being viewed. The user can skip ahead to the next clip with button 624, skip back to the previous clip with button 626, and return to the Clip set (list) view with button 628 at any time.

Having now described examples of editing and logging it should be apparent that the foregoing are merely example limitations and that a variety of different kinds of interfaces can be used to enable logging of events and editing of clips based on those logged events.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system can include clients and servers. A client and server are generally remote from each other and typically interact over a communication network. The relationship of client and server arises by virtue of computer programs running on the respective computers and having a client-server relationship to each other.

Having described an example embodiment, it should be apparent to those skilled in the art that the foregoing is merely illustrative and not limiting, having been presented by way of example only. Numerous modifications and other embodiments are with the scope of ordinary skill in the art and are contemplated as falling with the scope of the invention.

What is claimed is:

1. A video production process, comprising:
  logging data about events of interest occurring in an activity during the activity, by:
    receiving, in a computing device, indications from a user during the activity about occurrences of different kinds of events occurring during the activity, and data about the indicated events;
    in response to each indication from a user of one of the indicated events, capturing a time stamp of when the indication of the one of the indicated events was received;
    further in response to each indication from a user of one of the indicated events, transitioning from a primary state, in which the user interface for inputting events is displayed, to an event processing state in which the user interface allows a user to enter data for the indicated event, and transitioning processing from the event processing state to the primary state after a user completes the input for the event;
    storing, as logged data, the data about the indicated events and the timestamps for the indicated events;
  capturing video data of the activity, the video data including time stamps for when the video data was captured;
  in response to user input, selecting with a computing device events of interest for a video production from the logged data;
  in the computing device, synchronizing the time stamps from the logged data with the time stamps of the captured video data; and
  generating a set of video clips of the captured video data in the computing device corresponding to the selected events by matching the synchronized time stamps of the selected events to the time stamps of the video data.

2. The video production process of claim 1, further comprising receiving the indicated occurrences of events in a game in real time as the events happen.

3. The video production process of claim 2, further comprising prompting the user to associate a selected one of the events with a frame of the video data to synchronize the time stamps of the events with the time stamps of the video data.

4. The video production process of claim 3, further comprising receiving from a user a selection of a kind of event, and prompting the user to select a player to associate with the event, and creating event data based on the selected kind of event and the selected player.

5. The video production process of claim 1, further comprising prompting a user to associate a selected one of the events with a frame of the video data to synchronize the time stamps of the events with the time stamps of the video data.

6. The video production process of claim 5, further comprising receiving from a user a selection of a kind of event, and prompting the user to select a player to associate with the event, and creating event data based on the selected kind of event and the selected player.

7. A video production system comprising:
  a processing system and non-transitory storage, the processing system being configured by computer program code to provide a user interface, wherein the user interface is responsive to user input to log data about different kinds of events of interest occurring in an activity, such logging occurring during the activity,
    wherein the user interface includes a mechanism to receive indications from a user during the activity about occurrences of different kinds of events occurring during the activity, and data about the indicated events, the processing system being configured to, in response to each indication from a user of one of the indicated events, capture a time stamp of when the indication of the one of the indicated events was received, and being further configured to, in response to the user input, store as logged data in the storage the data about the indicated events and the time stamps for the indicated events, and
    wherein the logging tool has at least a primary state in which the user interface for inputting events is displayed, an event processing state to which processing transitions upon selection of an event, wherein the logging tool is configured to present a user interface that allows a user to enter data for the event, wherein processing transitions from the event processing state to the primary state after a user completes the input for the event;
  a video capture system that captures video data of the activity into data files on a computer, the video data including time stamps for when the video data was captured; and
  a processing system configured by a computer program code to synchronize the time stamps from the logged data with the time stamps of the captured video data.

8. The video production system of claim 7, wherein the user interface of the logging tool allows a user to indicate occurrences of events in a game in real time as the events happen.

9. The video production system of claim 8, wherein the editing tool prompts a user to associate a selected one of the events with a frame of the video data to synchronize the time stamps of the events with the time stamps of the video data.

10. The video production system of claim 9, wherein the user interface of the logging tool is configured to allow a user to select a kind of event, and to prompt the user to select a player to associate with the event, and to create event data based on the kind of event and the selected player.

11. The video production system of claim 7, wherein the editing tool prompts a user to associate a selected one of the events with a frame of the video data to synchronize the time stamps of the events with the time stamps of the video data.

12. The video production system of claim 11, wherein the user interface of the logging tool is configured to allow a user to select a kind of event, and to prompt the user to select a player to associate with the event, and to create event data based on the kind of event and the selected player.

13. The video production system of claim 7, wherein the user interface of the logging tool is configured to allow a user to select a kind of event, and to prompt the user to select a player to associate with the event, and to create event data based on the kind of event and the selected player.

14. A video production system, comprising:
  a first computer comprising a processor and executing a logging tool, comprising a user interface responsive to user input to log data about different kinds of events of interest occurring in an activity, such logging taking place during the activity, wherein the user interface includes a mechanism to receive indications from a user during the activity about occurrences of different kinds of events occurring during the activity, and data about the indicated events, the processing system being configured to, in response to each indication from a user of one of the indicated events, capture a time stamp of when the indication of the one of the indicated events was received, and, in response to the user input to store in storage, as logged data, the data about the indicated events with the time stamps for the indicated events, and wherein the logging tool has at least a primary state in which the user interface for inputting events is displayed, an event processing state to which processing transitions upon selection of an event, wherein the logging tool is configured to present a user interface that allows a user to enter data for the event, wherein processing transitions from the event processing state to the primary state after a user completes the input for the event; and a second computer comprising a processor and executing an editing tool, comprising memory storing information synchronizing the time stamps of the indicated events in the logged data with time stamps of video data of the activity stored in storage accessible to the editing tool, a user interface having a mechanism responsive to user input to select events of interest for a video production from the logged data and generating information defining clips of the video data by matching the synchronized time stamps of the selected events to the time stamps of the video data;

the memory being further arranged to store the information defining the clips of the video data corresponding to the selected events.

15. The video production system of claim 14, wherein the user interface of the logging tool allows a user to indicate occurrences of events in a game in real time as the events happen.

16. The video production system of claim 15, wherein the editing tool prompts a user to associate a selected one of the events with a frame of the video data to synchronize the time stamps of the events with the time stamps of the video data.

17. The video production system of claim 16, wherein the user interface of the logging tool is configured to allow a user to select a kind of event, and to prompt the user to select a player to associate with the event, and to create event data based on the kind of event and the selected player.

18. The video production system of claim 14, wherein the editing tool prompts a user to associate a selected one of the events with a frame of the video data to synchronize the time stamps of the events with the time stamps of the video data.

19. The video production system of claim 14, wherein the user interface of the logging tool is configured to allow a user to select a kind of event, and to prompt the user to select a player to associate with the event, and to create event data based on the kind of event and the selected player.

20. The video production system of claim 15, wherein the user interface of the logging tool is configured to allow a user to select a kind of event, and to prompt the user to select a player to associate with the event, and to create event data based on the kind of event and the selected player.

* * * * *